(12) United States Patent
Lee

(10) Patent No.: US 7,473,018 B2
(45) Date of Patent: Jan. 6, 2009

(54) BACK LIGHT ASSEMBLY AND LIQUID CRYSTAL DISPLAY DEVICE HAVING THE SAME

(75) Inventor: Hea-Chun Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 159 days.

(21) Appl. No.: 10/518,551

(22) PCT Filed: Jul. 3, 2003

(86) PCT No.: PCT/KR03/01303

§ 371 (c)(1), (2), (4) Date: Dec. 22, 2004

(87) PCT Pub. No.: WO2004/006002

PCT Pub. Date: Jan. 15, 2004

(65) Prior Publication Data

US 2005/0213311 A1 Sep. 29, 2005

(30) Foreign Application Priority Data

Jul. 4, 2002 (KR) .............................. 2002-38743

(51) Int. Cl.
*F21V 3/00* (2006.01)

(52) U.S. Cl. ................... 362/609; 362/621; 362/632; 362/634

(58) Field of Classification Search ......... 362/611–614, 362/621, 632–634, 561, 26–27, 609, 623; 349/58, 70, 61–63, 65, 67
See application file for complete search history.

(56) References Cited

U.S. PATENT DOCUMENTS

| | | | | |
|---|---|---|---|---|
| 5,253,089 A | * | 10/1993 | Imai | 349/65 |
| 5,442,522 A | | 8/1995 | Kalmanash | 362/26 |
| 5,788,356 A | * | 8/1998 | Watai et al. | 362/621 |
| 6,419,369 B1 | | 7/2002 | Itoh | 362/26 |
| 6,497,946 B1 | * | 12/2002 | Kretman et al. | 428/317.9 |

(Continued)

FOREIGN PATENT DOCUMENTS

DE 19844921 A1 4/2000

(Continued)

*Primary Examiner*—Jacob Y Choi
*Assistant Examiner*—Robert May
(74) *Attorney, Agent, or Firm*—MacPherson Kwok Chen & Heid, LLP.; Jeffrey A. Hopkins

(57) ABSTRACT

A back light assembly includes a light guide plate (LGP), a light reflecting member (LRM), at least two lamps, and a receiving container. The LGP includes a light incidence face having a width that is a first distance, a light reflecting face for reflecting a first light, and a light exiting face for emitting the reflected first light as a second light. The LRM covers the light incidence face to form a receiving space defined by the LRM and the light incidence face. The at least two lamps are disposed in the receiving space and spaced apart from each other by a second distance. A sum of diameters of the two lamps and the second distance is longer than the first distance. The receiving container receives the LGP and the LRM, where the LRM includes a chamfer disposed at an edge, the chamfer enhancing a reflection efficiency.

36 Claims, 10 Drawing Sheets

U.S. PATENT DOCUMENTS

| | | | |
|---|---|---|---|
| 6,609,807 B2 * | 8/2003 | Torihara et al. | 362/613 |
| 6,672,733 B2 * | 1/2004 | Nagatani | 362/614 |
| 2001/0036068 A1 * | 11/2001 | Suzuki et al. | 362/31 |
| 2001/0055204 A1 | 12/2001 | Mitsuteru | 362/27 |

FOREIGN PATENT DOCUMENTS

| | | |
|---|---|---|
| JP | 09-082123 | 3/1997 |
| JP | 09-090135 | 4/1997 |
| JP | 09-152600 | 6/1997 |
| JP | 2002-006314 | 1/2002 |

\* cited by examiner

BACK LIGHT ASSEMBLY AND LIQUID CRYSTAL DISPLAY DEVICE HAVING THE SAME

TECHNICAL FIELD

The disclosure relates to a back light assembly and a liquid crystal display (LCD) device having the back light assembly, and more particularly to a back light assembly having a reduced weight, volume and thickness and a liquid crystal display device having the back light assembly.

BACKGROUND ART

A liquid crystal display device regulates the transmissivity of light by controlling the liquid crystal so as to display an image. The thickness of a liquid crystal layer in a liquid crystal display device is a only few μm, so that the liquid crystal display device has a light weight, a thin thickness and a small size in comparison with a cathode ray tube (CRT) display device.

The liquid crystal display device includes a liquid crystal display panel assembly, a backlight assembly and a chassis.

The liquid crystal display panel assembly uses the liquid crystal so as to display images. Electric fields applied to the liquid crystal by a minute area of the liquid crystal display panel assembly, regulate the transmissivity of the light, so that each of the minute area of liquid crystal display panel assembly have different light quantity respectively. Therefore, the liquid crystal display panel assembly displays images.

The backlight assembly supplies light to the liquid crystal display panel assembly. The back light assembly includes a light guide plate (LGP). The light guide plate converts a linear light from a light source to planar light having uniform luminance. Therefore, the liquid crystal display device displays high quality images. The back light assembly includes a receiving container.

The receiving container receives the back light assembly and the liquid crystal display panel assembly.

The chassis fixes the back light assembly and the liquid crystal display panel assembly. The liquid crystal display panel assembly is fragile. Therefore, the chassis protects the liquid crystal display panel assembly.

The performance of the liquid crystal display device having these elements is determined by the thickness, the weight, the luminance of the display and so on. Especially, when the liquid crystal display device is portable, the thickness, the weight and the volume become more important.

In order to reduce the thickness, weight and volume, many attempts, for example replacing the glass of the liquid crystal panel with the glass having low density, adapting the back light assembly having no sheet, etc. have been tried.

The light guide plate contributes much portion of the weight of the liquid crystal display device. However, replacing the material of the light guide plate may not reduce the weight of the light guide plate.

Further, the thickness of the light guide plate is not easily reduced, due to the arrangement of a lamp.

The thickness of the light guide plate relates to the diameter of the lamp.

A general liquid crystal display device has at least two lamps arranged parallel on a light exiting face of the light guide plate to enhance the luminance.

Therefore, in order to reduce the thickness of the light guide plate, the diameter of the lamp may be reduced. However, there is a limit to reduce the diameter of the lamp.

If the diameter is reduced below the limit, the luminance becomes lower, so that the lamp is useless.

DISCLOSURE OF THE INVENTION

The present invention provides a back light assembly having reduced weight, volume and thickness.

The present invention also provides a liquid crystal display (LCD) device having reduced weight, volume and thickness.

In one aspect of the invention, a backlight assembly, alternatively a back light assembly. includes a light guide plate, a light reflecting member, at least two lamps and a receiving container. The light guide plate includes a light incidence face, a light reflecting face and a light exiting Lace. The light reflecting face reflects a first light toward the light exiting face to transform the first light into a second light. The second light exits from the light exiting face. A width of the light incidence face is a first distance. The light reflecting member covers the light incidence face so as to form a lamp receiving space. The light reflecting member and the light incidence face define the lamp receiving space.

The two lamps are disposed in the lamp receiving space. The two lamps are spaced apart from each other by a second distance. A sum of diameters of the two lamps and the second distance is longer than the first distance. The receiving container receives the light guide plate and the light reflecting member. where the light reflecting member includes a chamfer disposed at an edge. the chamfer enhancing a reflection efficiency.

In another aspect of the invention, the liquid crystal display device includes the back light assembly above described, a liquid crystal display panel assembly, and a chassis. The liquid crystal display panel assembly displays an image. The liquid crystal display panel assembly faces the light exiting face. The receiving container receives the liquid crystal display panel assembly. A first portion of the chassis presses an edge of the liquid crystal display panel. A second portion of the chassis is combined with the receiving container so as to prevent the liquid crystal display panel from being detached from the receiving container, where the light reflecting member includes a chamfer disposed at an edge, the chamfer enhancing a reflection efficiency.

According to the present invention, the thickness of the back light assembly of the liquid crystal display device is reduced, and the luminance of the liquid crystal display device may be increased. In addition, the weight and volume of the liquid crystal display device is reduced.

BRIEF DESCRIPTION OF THE DRAWINGS

The above and other advantages of the present invention will become readily apparent by reference to the following detailed description when considered in conjunction with the accompanying drawings wherein.

BEST MODE FOR CARRYING OUT THE INVENTION

Figure 1:
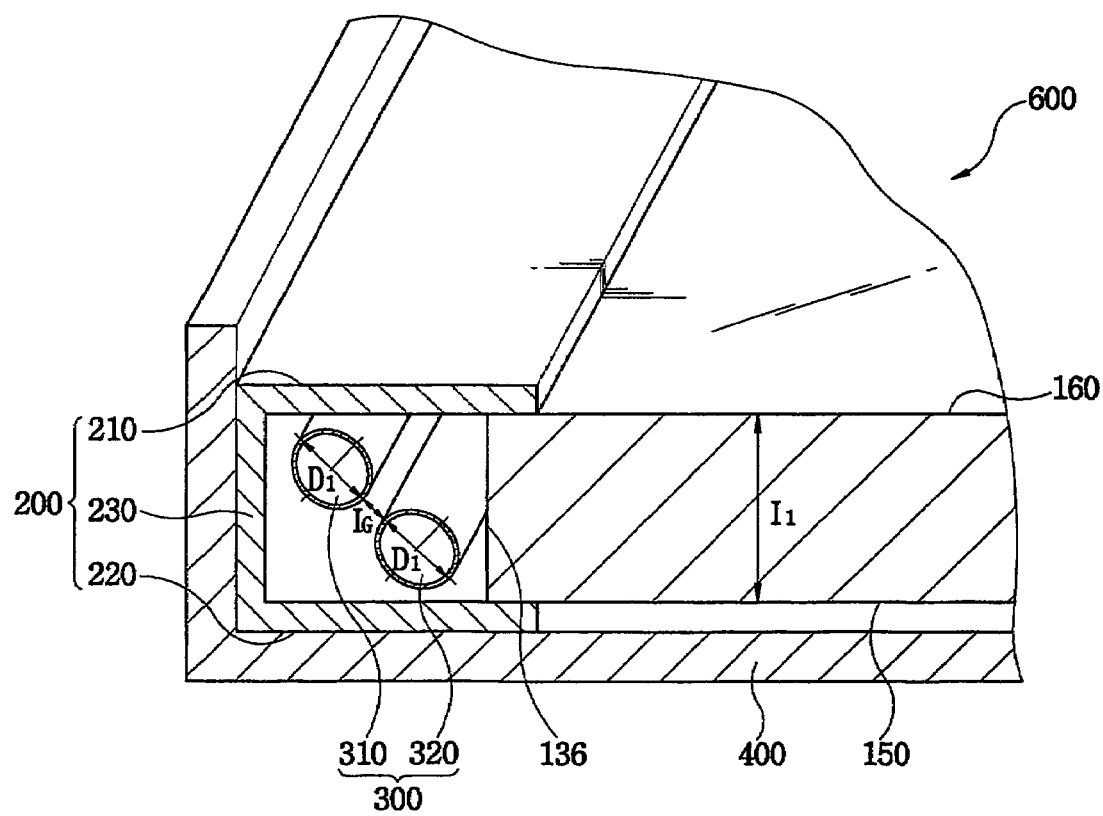
FIG. 1 is a partial cross-sectional perspective view showing a back light assembly according to a first exemplary embodiment.

FIG. 1 is a partial cross-sectional perspective view showing a back light assembly according to a first exemplary embodiment.

Referring to FIG. 1, a back light assembly 600 includes a light guide plate, a light reflecting member 200, lamps 300 and a receiving container 400.

The light guide plate may be a wedge type or a flat type light guide plate.

Figure 2:
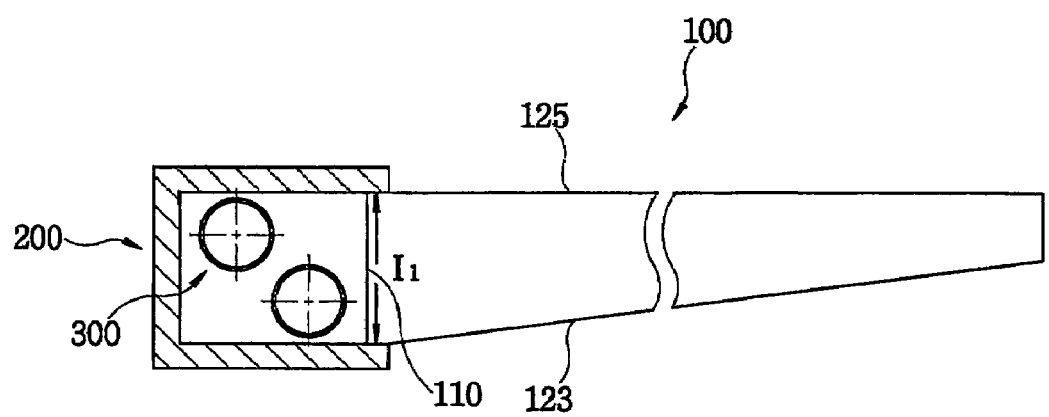
FIG. 2 is a cross-sectional view showing a wedge type light-guide plate according to a second exemplary embodiment.

FIG. 2 is a cross-sectional view showing a wedge type light guide plate according to a second exemplary embodiment.

Referring to FIG. 2, the wedge type light guide plate 100 has four side faces, a light reflecting face 123 and a light exiting face 125. Light enters into the light guide plate 100 through one of the four side faces. Hereinafter, the side face through which the light enters into the light guide plate 100 is referred to as a light incidence face 110.

The wedge type light guide plate 100 has one light incident face 110. A thickness of a portion of wedge type light guide plate 100 becomes thinner in the opposite direction of the lamps 300.

A width of the light incidence face is a first distance $I_1$. A light reflecting member 200 covers the light incident face 110, so that a lamp receiving space for receiving the lamps 300 is formed.

Figure 3:
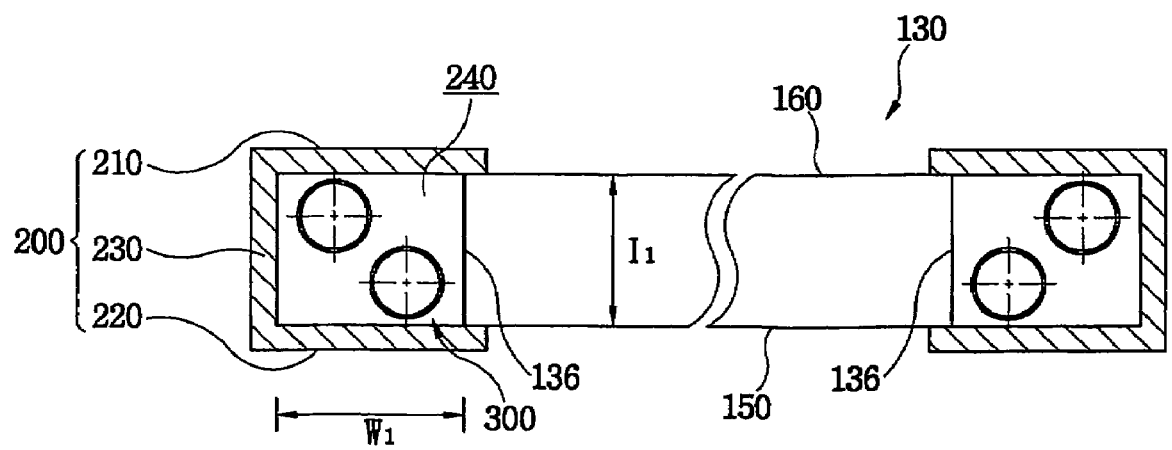
FIG. 3 is a cross-sectional view showing a flat type light-guide plate of FIG. 1.

FIG. 3 is a cross-sectional view showing a flat type light guide plate of FIG. 1.

Referring to FIG. 3, a flat type light guide plate 130 has four side faces, a light reflecting face 150 and a light exiting face 160. Light enters into the light guide plate 130 through two parallel side faces that are called as light incidence faces 136.

The thickness of the light guide plate 130 is uniform, so that the distance between the light reflecting face 150. The width of the light exiting face 160 is a first distance $I_1$.

One of the wedge type light guide plate of FIG. 2 and the flat type light guide plate of FIG. 3. may be used for the light guide plate.

Referring to FIGS. 1 and 3, a light reflecting member 200 is attached to the light reflecting face 150 and the light exiting face 160, so that the light reflecting member 200 covers the light incidence face 136.

The light reflecting member 200 includes a first reflecting plate 210, a second reflecting plate 220 and a third reflecting plate 230. The third reflecting plate 230 connects the first reflecting plate 210 with the second reflecting plate 220. The first reflecting plate 210 is attached to the light exiting face 160, and the second reflecting plate 220 is attached to the light reflecting face 150.

The first reflecting plate 210, the second reflecting plate 220, the third reflecting plate 230 and the light incidence face 136 forms a lamp receiving space 240.

The lamp receiving space 240 receives at least two lamps 300. The at least two lamps 300 are disposed in parallel and spaced apart from each other.

Referring again to FIG. 1, a first diameter of the first lamp 310 is referred to as $D_1$, and a second diameter of the second lamp 320 is referred to as $D_2$. The first diameter $D_1$ of the first lamp 310 may be substantially equals to the second diameter $D_2$ of the second lamp 320. However, the first diameter $D_1$ of the first lamp 310 may be different from the second diameter $D_2$ of the second lamp 320. A sum of the first diameter $D_1$ of the first lamp 310 and the second diameter $D_2$ of the second lamp 320 is less than the first distance $I_1$.

The distance between the outer surfaces of the first lamp 310 and the second lamp 320 is referred to as $I_G$.

The sum of the first diameter $D_1$ of the first lamp 310, the second diameter $D_2$ of the second lamp 320 and the distance $I_G$ is larger than the first distance $I_1$.

When the sum of the first diameter $D_1$ of the first lamp 310, the second diameter $D_2$ of the second lamp 320 and the distance $I_G$ is larger than the first distance $I_1$, the center of the first lamp 310 and the center of the second lamp 320 does not exist on the same plane which is parallel to the light incidence face 136. In this case, the width of the lamp receiving space is a first width $W_1$.

Figure 4:
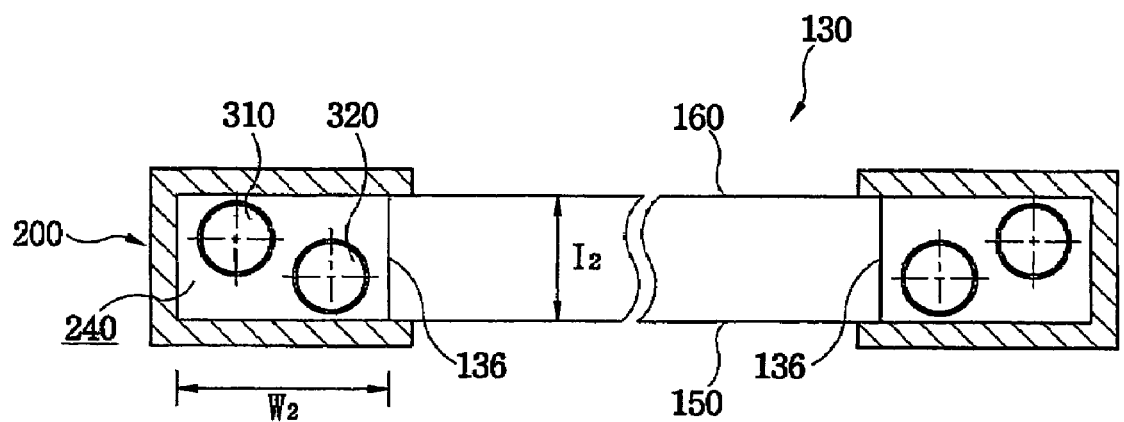
FIG. 4 is a cross-sectional view showing a flat type light-guide plate according to a third exemplary embodiment.

FIG. 4 is a cross-sectional view showing a flat type light guide plate according to a third exemplary embodiment.

Referring to FIG. 4, the second distance 12 that is a width of the light incidence face 136 of FIG. 4 is smaller than the first distance $I_1$ that is a width of the light incidence face 136 of FIG. 3. Therefore, the volume and weight of the third exemplary embodiment are reduced in comparison with the second exemplary embodiment. In this case, the second width $W_2$ of the lamp receiving space of FIG. 4 is increased in comparison with the first width $W_1$ of the lamp receiving space of FIG. 3 so as to receive the lamps of FIG. 4 that have the same diameters as those of the lamps of FIG. 3. The highest point of lower lamp 320 is higher than the lowest point of upper lamp 310, as shown in FIG. 4 and elsewhere.

Figure 5:
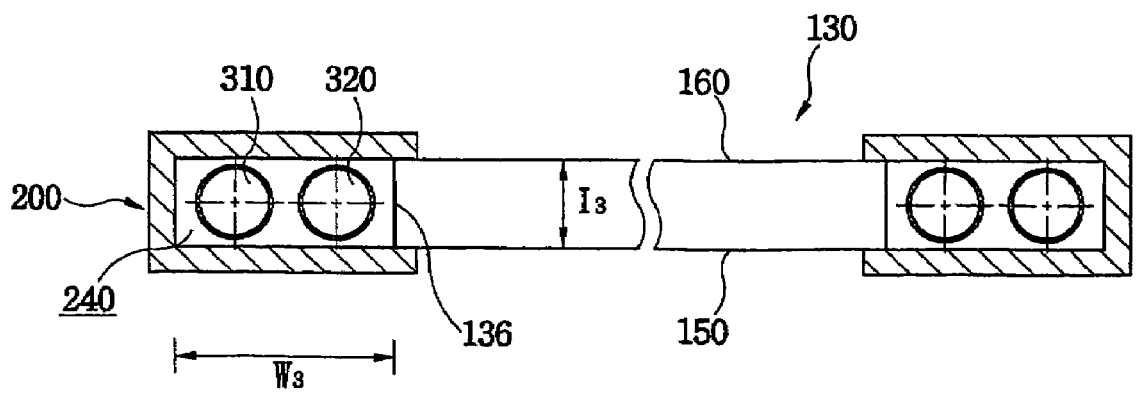
FIG. 5 is a cross-sectional view showing a flat type light-guide plate according to a fourth exemplary embodiment.

FIG. 5 is a cross-sectional view showing a flat type light guide plate according to a fourth exemplary embodiment.

Referring to FIG. 5, a center of the first lamp 310 and a center of the second lamp 320 are disposed on the same plane that is parallel to a light exiting face 160.

A third distance $I_3$ that is a width of a light guide plate 130 of FIG. 5 is reduced in comparison with the second distance $I_2$ that is the width of the light guide plate 130 of FIG. 4. The third distance $I_3$ is almost equal to (but larger than) the diameters of the first lamps 310 and the second lamp 320 ($D_1$, $D_2$ $I_3$).

A weight and a volume of the light guide plate 130 of FIG. 5 become smaller than those of the light guide plate of FIG. 4. However, a third width $W_3$ of the lamp receiving space 240 becomes larger than the second width $W_2$ of the lamp receiving space 240 of FIG. 4 so as to receive the lamps of FIG. 5 having same diameters as those of the lamps of FIG. 4.

The thinner the light guide plate is, the wider is the width of the lamp receiving space 240. The first lamp 310 and the second lamp 320 are horizontally disposed, as shown in FIG. 5 and elsewhere.

Hereinafter, back light assemblies including the lamp receiving spaces having reduced widths are disclosed.

Figure 6:
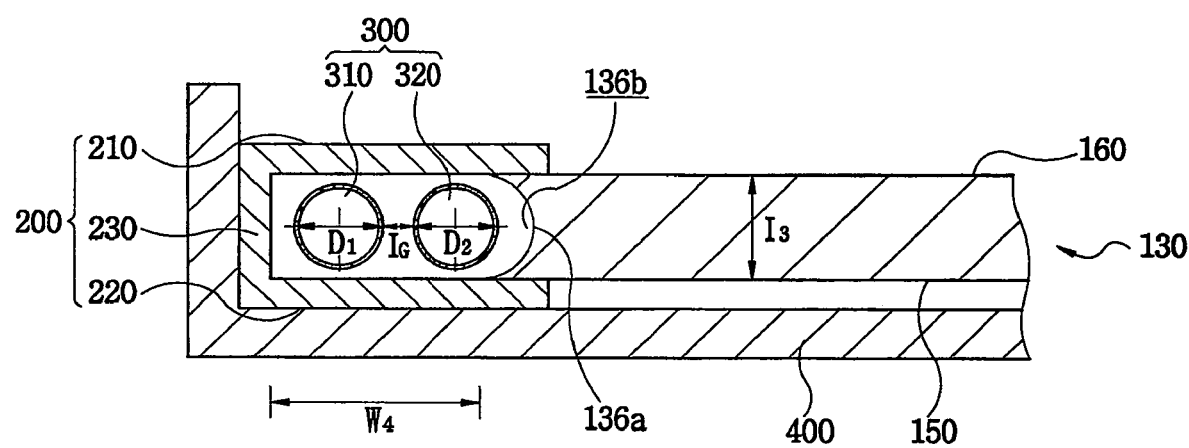
FIG. 6 is a partial cross-sectional view showing a back light assembly having a light-guide plate having a round shaped light incidence face according to a fifth exemplary embodiment.

FIG. 6 is a partial cross-sectional view showing a back light assembly having a light guide plate having a round shaped light incidence face according to a fifth exemplary embodiment. A back light assembly according to a fifth exemplary embodiment has a light guide plate. A light incidence face 136 of the light guide plate has guide a groove 136b for accepting the second lamp 320 so as to minimize a fourth width $W_4$ of the lamp receiving space. Referring to FIG. 6, the light incidence face 136a facing the second lamp 320 has a lamp receiving groove 136b that has a concave shape (or curved shape).

The lamp receiving groove 136b may receive the entire second lamp 320 or a portion of the second lamp 320, so that the fourth width $W_4$ of the lamp receiving space of the light reflecting member 200 is reduced in comparison with the width $W_3$ of FIG. 5. Therefore, the volume and weight of the back light assembly may be reduced.

When the first lamp 310 and the second lamp 320 are disposed parallel with the light exiting face 160, a third distance $I_3$ that is a thickness of the light guide plate, and a fourth width $W_4$ of the lamp receiving space may be minimized.

As a result, when the first lamp 310 and the second lamp 320 are disposed parallel with the light exiting face 160, a light guide plate 130 has a reduced thickness, a reduced volume and a reduced weight, but that is a width of the lamp receiving space has increased width. However, the groove 136b may reduce the width. Therefore, the groove 136b reduces the weight and volume of the light guide plate 130. Further, a luminance of the liquid crystal display panel assembly is increased, because the groove 136b increases an area of the light incidence face, and the groove 136b changes a path of the light toward the light exiting face 160.

Figure 7:
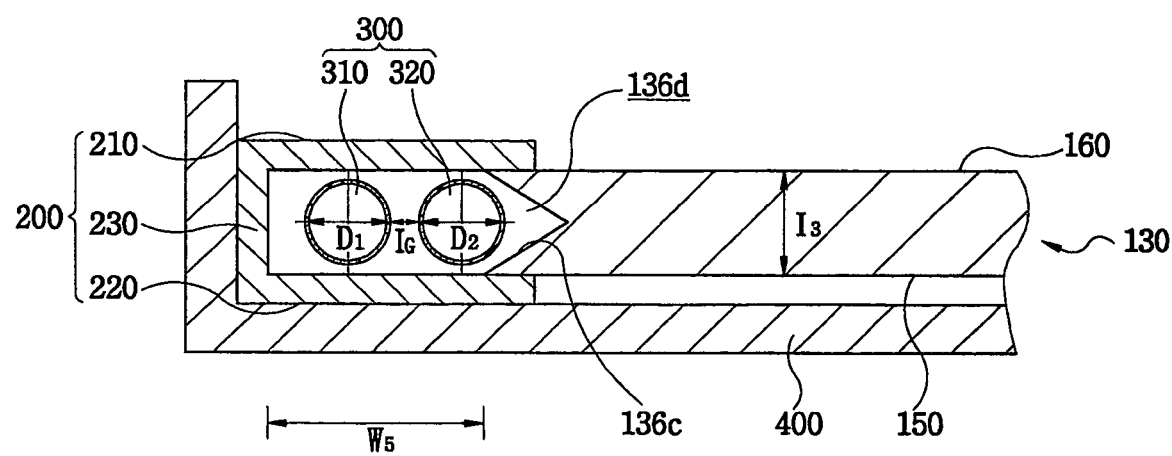
FIG. 7 is a partial cross-sectional view showing a back light assembly having a light-guide plate having a V-shaped light incidence face according to a sixth exemplary embodiment.

FIG. 7 is a partial cross-sectional view showing a back light assembly having a light guide plate having a V-shaped light incidence face according to a sixth exemplary embodiment.

Referring to FIG. 7, a lamp receiving groove 136d is formed at a light incidence face 136c facing a second lamp 320.

A cross-section of the groove 136d has a V-shape. The cross-section is taken along a line perpendicular to a longitudinal direction of the lamps.

The groove 136d may receive the entire second lamp 320 or a portion of the second lamp 320, so that the fifth width $W_5$ of the lamp receiving space is reduced.

Therefore, a total length of the back light assembly is reduced even when the light guide plate 130 has thickness 13 almost the same as diameter $D_2$ of the second lamp 320.

According to the sixth exemplary embodiment of the present invention, the groove 136d of the FIG. 7 reduces the width $W_5$ of the lamp receiving space. Therefore, the weight, the volume and the thickness of the back light assembly are reduced. Further, a luminance of the liquid crystal display panel assembly is increased, because the groove 136d increases an area of the light incidence face, and the groove 136d changes a path of the light toward the light exiting face 160.

Figure 8:
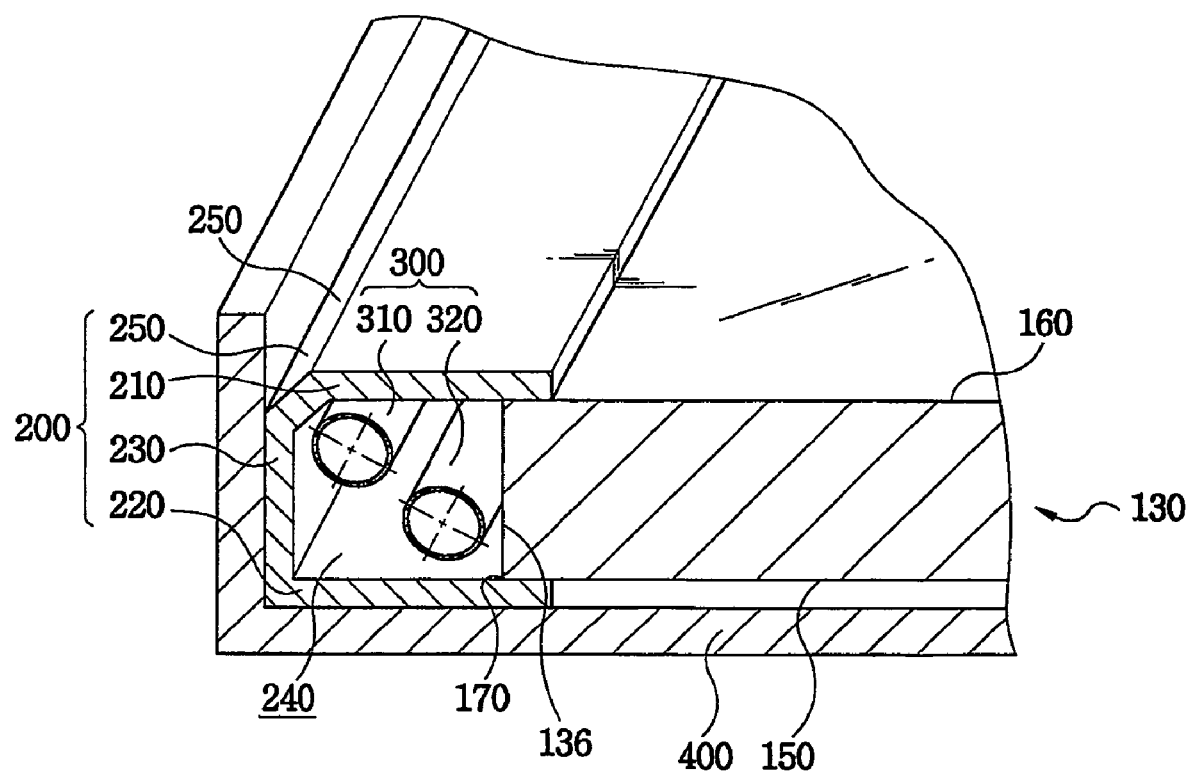
FIG. 8 is a partial cross-sectional perspective view showing a back light assembly according to a seventh exemplary embodiment.
Figure 9:
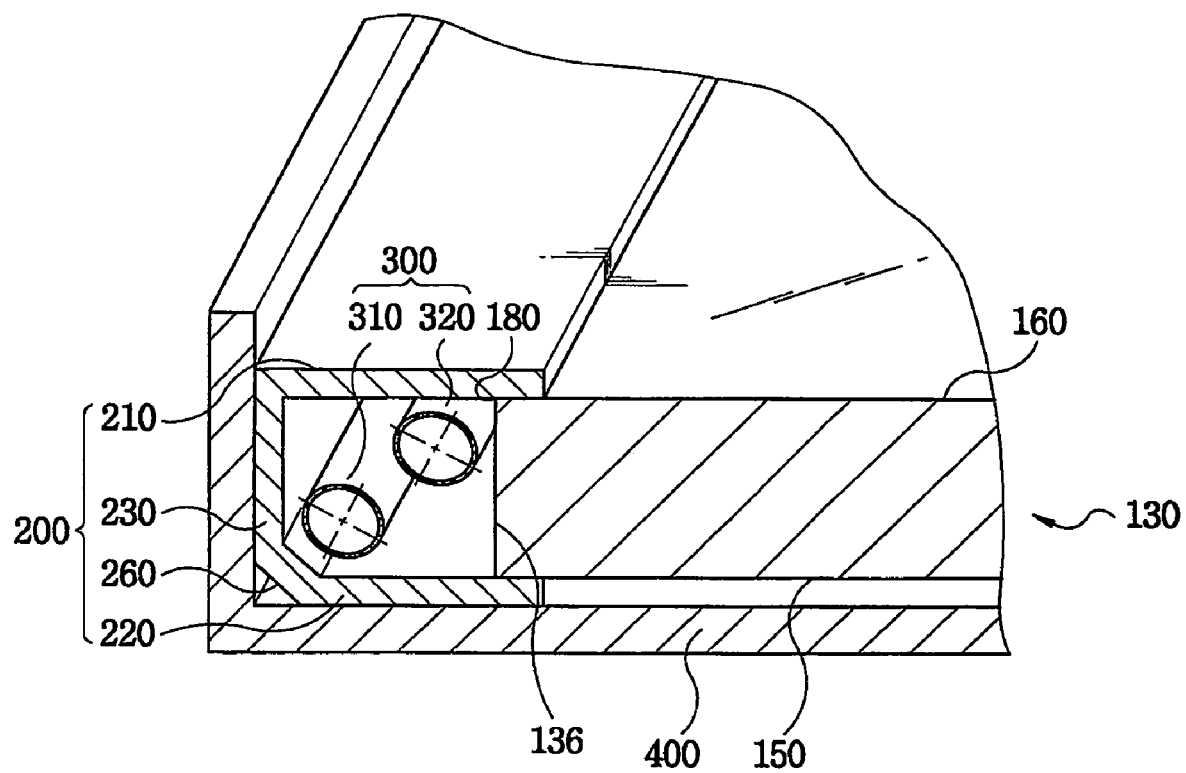
FIG. 9 is a partial cross-sectional perspective view showing a back light assembly according to an eighth exemplary embodiment.

FIG. 8 is a partial cross-sectional perspective view showing a back light assembly according to a seventh exemplary embodiment, and FIG. 9 is a partial cross sectional perspective view showing a back light assembly according to an eighth exemplary embodiment Referring to FIG. 8, a light reflecting member 200 includes a chamfer 250 for enhancing the light utilization efficiency.

The position of the chamfer 250 is determined according to the position of the first lamp 310 and the second lamp 320 disposed in the light reflecting member 200.

The chamfer 250 is formed at a second edge of a light reflecting body 200. The second edge is diagonally opposite to a first edge 170 of a light incidence face 136 and a light reflecting face 150. In other words, as shown in FIG. 8, the chamfer 250 is formed at the portion where a first reflecting plate 210 is connected to a third reflecting plate 230.

The chamfer 250 effectively reflects the light generated from a first lamp 310 toward the light incidence surface 136.

On the contrary, in FIG. 9, the chamfer 260 is fanned at a fourth edge of a light reflecting body 200. The fourth edge is diagonally opposite to a third edge of the light incidence face 136 and the light exiting face 160. In other words, the chamfer 260 is Conned at the portion where a second reflecting plate 220 is connected to a third reflecting plate 230.

The chamfer 260 effectively reflects the light generated from the first lamp 310 toward the light incidence surface 136.

The chamfers 250 and 260 reflects the light generated by the first lamp 310 effectively toward the light incidence face 136.

The chamfers 250 or 260 of the light reflecting member 200 enhances the light utilization efficiency.

A receiving container 400 receives the light reflecting body 200, the first lamp 310, the second lamp 320 and the light guide plate 130.

Figure 10:
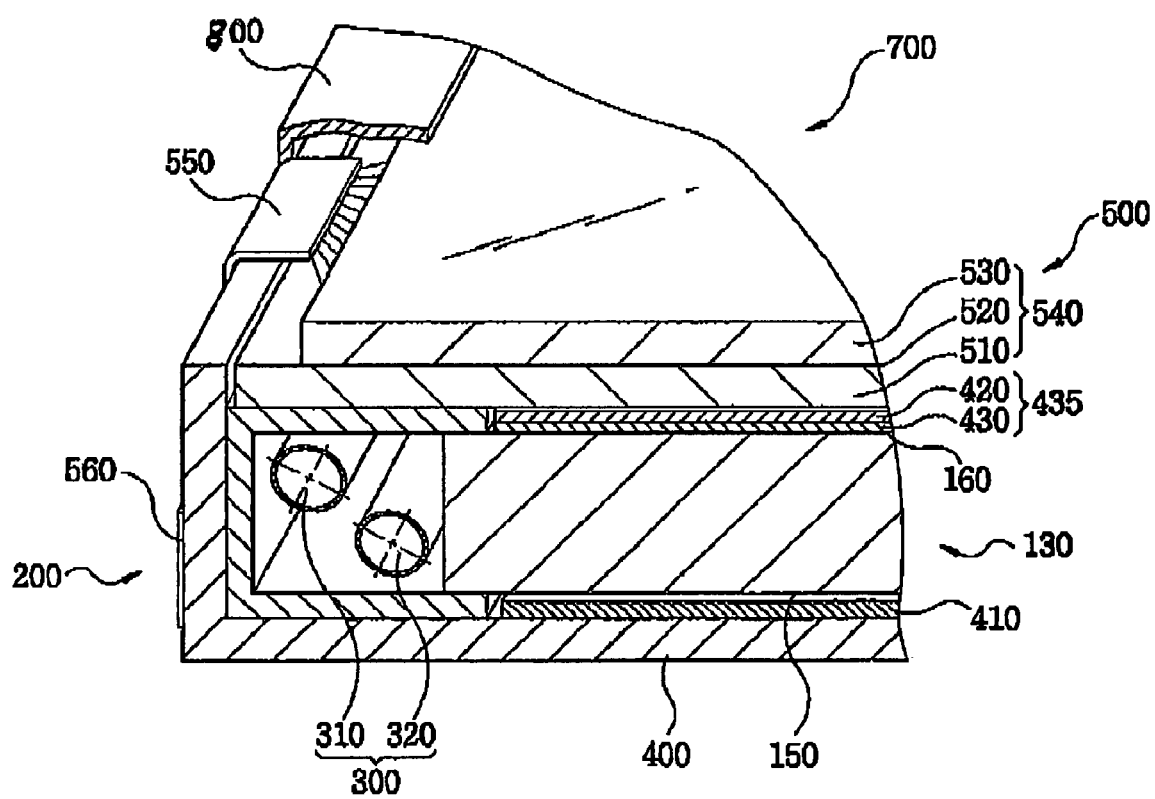
FIG. 10 is a partial cross-sectional perspective view showing a liquid crystal display device.

FIG. 10 is a partial cross-sectional perspective view showing a liquid crystal display device.

Referring to FIG. 10, a liquid crystal display device includes a chassis 800, a liquid crystal display panel assembly 500, a receiving container 400, lamps 300, a light reflecting member 200 and a light guide plate 130.

The receiving container 400, lamps 300, light reflecting member 200 and light guide plate 130 may be one of the previous embodiments, so that detailed descriptions of the receiving container 400, lamps 300, light reflecting member 200 and light guide plate 130 are omitted.

The liquid crystal display panel assembly 500 includes a liquid crystal display panel 540, a tape carrier package 550 and a printed circuit board (PCB) 560.

The liquid crystal display panel 540 includes a thin film transistor substrate (TFT substrate) 510, liquid crystal layer 520 and color filter substrate 530.

Figure 11:
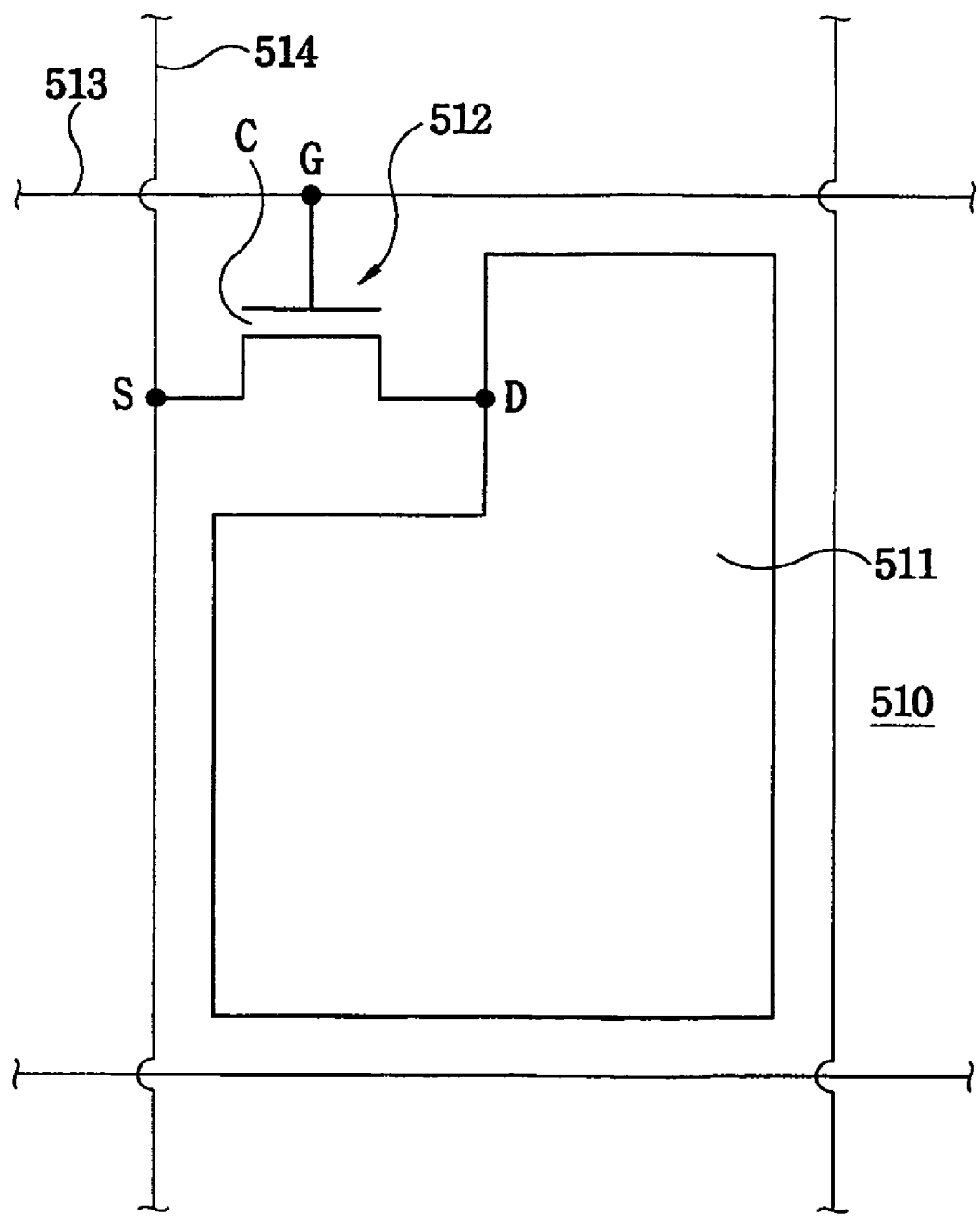
FIG. 11 is a schematic view showing a TFT substrate of FIG. 10.

FIG. 11 is a schematic view showing a thin film transistor substrate of FIG. 10.

Referring to FIG. 11, a thin film transistor 512 formed on the thin film transistor substrate 510 of FIG. 10 includes a gate electrode G, drain electrode D and source electrode S.

A transparent electrode 511 is formed on a glass substrate of the thin film transistor substrate 510. The transparent electrode 511 is electrically connected to the drain electrode of the thin film transistor 512. The transparent electrode 511 comprises Indium Tin Oxide (ITO) or Indium Zinc Oxide (IZO).

The gate electrode G is electrically connected to a gate line 513, so that a gate driving signal is applied to the thin film transistor 512 through the gate line 513.

The gate driving signal turns on the thin film transistor 512.

The source electrode S is electrically connected to a data line 514, so that an image signal is applied to the transparent electrode 511 through the data line 514.

Figure 12:
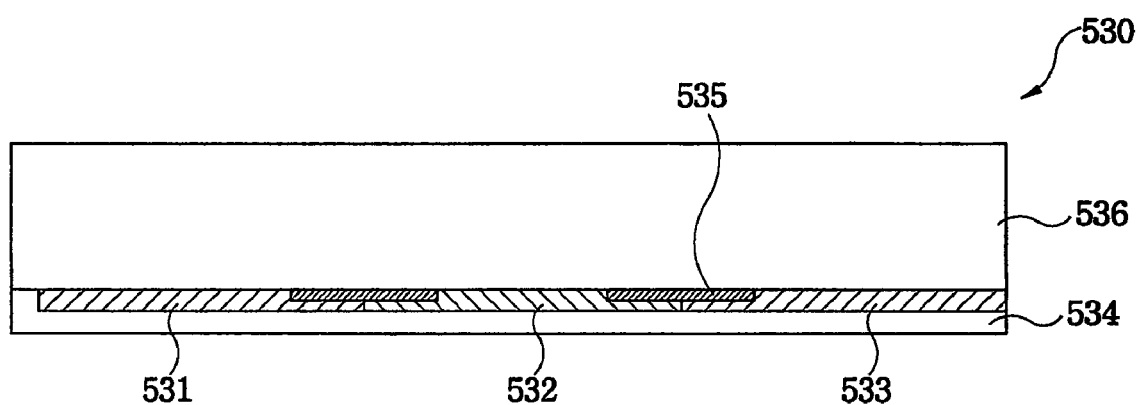
FIG. 12 is a schematic cross-sectional view showing a color filter substrate of FIG. 10.

FIG. 12 is a schematic cross-sectional view showing a color filter substrate of FIG. 10.

Referring to FIG. 12, the color filter substrate 530 includes color filters 531, 532 and 533, a common electrode 534 and black matrix 535 formed on a glass substrate 536.

The color filters 531, 532 and 533 are formed on a glass substrate 536. The color filters 531, 532 and 533 face the transparent electrode 511 of FIG. 11. The color filters include a red color filter 531, a green color filter 532, and a blue color filter 533.

The red color filter 531 includes a red color pigment or red color dyes for filtering the red light from the white light provided by lamps 300 as a white light source, as shown in FIG. 10.

The green color filter 532 includes a green color pigment or green color dyes for filtering the green light from the white light.

The blue color filter 533 includes a blue color pigment or blue color dyes for filtering the blue light from the white light.

The common electrode 534 is formed on the color filters 531, 532 and 533. The common electrode 534 comprises Indium Tin Oxide (ITO) that is conductive and transparent.

The tape carrier package 550 of FIG. 10 is electrically connected to the gate line 513 and the data line 514 of FIG. 11.

The tape carrier package 550 applies the gate driving signal and the data-driving signal outputted from the printed circuit board 560 to the gate line 513 and the data line 514, respectively.

As shown in FIG. 10, the liquid crystal display panel assembly 500 is fixed to the receiving container 400. The reflecting plate 410 is disposed between the bottom face of the receiving container 400 and the light reflecting face 150 of the light guide plate 130. The reflecting plate 410 reflects the light that is leaked from the light reflecting face 150.

Optical sheets 435 may be interposed between the thin film transistor substrate 510 and the light exiting face 160 of the light guide plate 130.

For example, the optical sheets 435 may include a diffusion sheet 430 and a prism sheet 420. The diffusion sheet 430 diffuses the light exiting from the light exiting face 160, and the prism sheet 420 concentrates the diffused light so as to improve the viewing angle of the liquid crystal display device.

A chassis 600 fixes the liquid crystal display panel assembly 500 to the receiving container 400 and protects the liquid crystal display panel assembly 500.

INDUSTRIAL APPLICABILITY

According to the present invention, the thickness of the back light assembly of the liquid crystal display device is reduced, and the luminance of the liquid crystal display device may be increased. In addition, the weight and volume of the liquid crystal display device is reduced.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

The invention claimed is:

1. A back light assembly, comprising:
    a light guide plate including a light incidence face, a light reflecting face and a light exiting face, the light reflecting face reflecting a first light toward the light exiting face to transform the first light into a second light, the second light exiting from the light exiting face, a width of the light incidence face being a first distance;
    a light reflecting member for covering the light incidence face so as to form a lamp receiving space, the lamp receiving space being defined by the light reflecting member and the light incidence face;
    at least two lamps disposed in the lamp receiving space, the two lamps being spaced apart from each other by a second distance, a sum of diameters of the two lamps and the second distance being longer than the first distance; and
    a receiving container for receiving the light guide plate and the light reflecting member,
    wherein the light reflecting member includes a chamfer disposed at an edge where a virtual line passing through centers of the two lamps meets the light reflecting member, whereby the chamfer reflects the light generated by the lamps toward the light incident face.

2. The back light assembly of claim 1, wherein the light incidence face has a groove for receiving a portion of one of the lamps.

3. The back light assembly of claim 2, wherein a cross-section of the groove has a curved shape, the cross-section being taken along a line perpendicular to a longitudinal direction of the lamps.

4. The back light assembly of claim 2, wherein a cross-section of the groove has a V-shape, the cross-section being taken along a line perpendicular to a longitudinal direction of the lamps.

5. The back light assembly of claim 1, wherein each diameter of each of the two lamps is substantially similar to each other.

6. The back light assembly of claim 1, wherein the lamps includes a first lamp and a second lamp, the first lamp being disposed near to a first edge of the light incidence face and the light reflecting face, and the second lamp being disposed near to a second edge of the light reflecting member, the second edge being diagonally opposite to the first edge.

7. The back light assembly of claim 6, wherein the chamfer is disposed at the second edge, the chamfer enhancing a light reflection efficiency.

8. The back light assembly of claim 1, wherein the lamps includes a first lamp and a second lamp, the first lamp being disposed near to a third edge between the light incidence face and the light exiting face, and a second lamp being disposed near to a fourth edge of the light reflecting member, the fourth edge being diagonally opposite to the third edge.

9. The back light assembly of claim 8, wherein the chamfer is disposed at the fourth edge, the chamfer enhancing a reflection efficiency.

10. The back light assembly of claim 1, wherein centers of the lamps are positioned in a same plane that is parallel to the light exiting face.

11. The back light assembly of claim 1, wherein the light reflecting member is positioned adjacent to the receiving container so as to make contact therewith.

12. The back light assembly of claim 1, wherein the light reflecting member is positioned between the light reflecting face of the light guide plate and the receiving container so as to form a gap therebetween.

13. The back light assembly of claim 1, wherein the two lamps are spaced apart from the light reflecting member.

14. A liquid crystal display device, comprising:
    a back light assembly including, i) a light guide plate including a light incidence face, a light reflecting face and a light exiting face, the light reflecting face reflecting a first light toward the light exiting face to transform the first light into a second light, the second light exiting from the light exiting face, a width of the light incidence face being a first distance, ii) a light reflecting member for covering the light incidence face so as to form a lamp receiving space, the lamp receiving space being defined by the light reflecting member and the light incidence face, iii) at least two lamps disposed in the lamp receiving space, the two lamps being spaced apart from each other by a second distance, a sum of diameters of the two lamps and the second distance being longer than the first distance, and iv) a receiving container for receiving the light guide plate and the light reflecting member;

a liquid crystal display panel assembly for displaying an image, the liquid crystal display panel assembly facing the light exiting face and being received by the receiving container; and a chassis, a first portion of the chassis pressing an edge of the liquid crystal display panel, a second portion of the chassis being combined with the receiving container so as to prevent the liquid crystal display panel from being detached from the receiving container, wherein the light reflecting member includes a chamfer disposed at an edge where a virtual line passing through centers of the two lamps meets the light reflecting member, whereby the chamfer reflects the light generated by the lamps toward the light incident face.

15. The liquid crystal display device of claim 14, wherein the light incidence face has a groove for receiving a portion of one of the lamps.

16. The liquid crystal display device of claim 15, wherein a cross-section of the groove has a curved shape, the cross-section being taken along a line perpendicular to a longitudinal direction of the lamps.

17. The liquid crystal display device of claim 15, wherein a cross-section of the groove has V-shape, the cross-section being taken along a line perpendicular to a longitudinal direction of the lamps.

18. The liquid crystal display device of claim 14, wherein each diameter of each of the two lamps is substantially similar to each other.

19. The liquid crystal display device of claim 14, wherein the lamps includes a first lamp and a second lamp, the first lamp being disposed near to a first edge between the light incidence face and the light reflecting face, and the second lamp being disposed near to a second edge of the light reflecting member, the second edge being diagonally opposite to the first edge.

20. The liquid crystal display device of claim 19, wherein the chamfer is disposed at the second edge, the chamfer enhancing a light reflection efficiency.

21. The liquid crystal display device of claim 14, wherein the lamps includes a first lamp and a second lamp, the first lamp being disposed near to a third edge between the light incidence face and the light exiting face, and a second lamp being disposed near to a fourth edge of the light reflecting member, the fourth edge being diagonally opposite to the third edge.

22. The liquid crystal display device of claim 21, wherein the chamfer is disposed at the fourth edge, the chamfer enhancing a reflection efficiency.

23. The liquid crystal display device of claim 14, wherein centers of the lamps are positioned in a same plane that is parallel to the light exiting face.

24. The liquid crystal display device of claim 14, wherein the light reflecting member is positioned adjacent to the receiving container so as to make contact therewith.

25. The liquid crystal display device of claim 14, wherein the light reflecting member is positioned between the light reflecting face of the light guide plate and the receiving container so as to form a gap therebetween.

26. The liquid crystal display device of claim 14, wherein the two lamps are spaced apart from the light reflecting member.

27. A back light assembly, comprising:

a light guide plate including a light incidence face, a light reflecting face and a light exiting face, the light reflecting face reflecting a first light toward the light exiting face to transform the first light into a second light, the second light exiting from the light exiting face, a width of the light incidence face being a first distance;

a light reflecting member for covering the light incidence face so as to form a lamp receiving space, the lamp receiving space being defined by the light reflecting member and the light incidence face;

at least two lamps disposed in the lamp receiving space, the two lamps being spaced apart from each other by a second distance, a sum of diameters of the two lamps and the second distance being longer than the first distance, the highest point of a lower lamp among the two lamps being higher than the lowest point of an upper lamp among the two lamps; and a receiving container for receiving the light guide plate and the light reflecting member.

28. The back light assembly of claim 27, wherein the light incidence face has a groove for receiving a portion of one of the lamps.

29. The back light assembly of claim 28, wherein a cross-section of the groove has a curved shape, the cross-section being taken along a line perpendicular to a longitudinal direction of the lamps.

30. The back light assembly of claim 28, wherein a cross-section of the groove has a V-shape, the cross-section being taken along a line perpendicular to a longitudinal direction of the lamps.

31. The back light assembly of claim 27, wherein each diameter of each of the two lamps is substantially similar to each other.

32. The back light assembly of claim 27, wherein the lamps includes a first lamp and a second lamp, the first lamp being disposed near to a first edge of the light incidence face and the light reflecting face, and the second lamp being disposed near to a second edge of the light reflecting member, the second edge being diagonally opposite to the first edge.

33. The back light assembly of claim 32, wherein the light reflecting member includes a chamfer disposed at the second edge, the chamfer enhancing a light reflection efficiency.

34. The back light assembly of claim 27, wherein the lamps includes a first lamp and a second lamp, the first lamp being disposed near to a third edge between the light incidence face and the light exiting face, and a second lamp being disposed near to a fourth edge of the light reflecting member, the fourth edge being diagonally opposite to the third edge.

35. The back light assembly of claim 34, wherein the light reflecting member includes a chamfer disposed at the fourth edge, the chamfer enhancing a reflection efficiency.

36. A back light assembly, comprising:

a light guide plate including a light incidence face, a light reflecting face and a light exiting face, the light reflecting face reflecting a first light toward the light exiting face to transform the first light into a second light, the second light exiting from the light exiting face, a width of the light incidence face being a first distance;

a light reflecting member for covering the light incidence face so as to form a lamp receiving space, the lamp receiving space being defined by the light reflecting member and the light incidence face; and at least two lamps disposed in the lamp receiving space, the two lamps being spaced apart from each other by a second distance, a sum of diameters of the two lamps and the second distance being longer than the first distance, the highest point of a lower lamp among the two lamps being higher than the lowest point of an upper lamp among the two lamps.

* * * * *